US012738170B2

(12) United States Patent
Shamasundar et al.

(10) Patent No.: US 12,738,170 B2
(45) Date of Patent: Sep. 15, 2026

(54) SYSTEM AND METHODS FOR FLIGHT PLAN MANAGEMENT

(71) Applicant: HONEYWELL INTERNATIONAL INC., Charlotte, NC (US)

(72) Inventors: Raghu Shamasundar, Bangalore (IN); Marc-Antoine Trupheme, Toulouse (FR); Wen Hua Liu, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 133 days.

(21) Appl. No.: 18/543,546

(22) Filed: Dec. 18, 2023

(65) Prior Publication Data

US 2025/0131834 A1 Apr. 24, 2025

(30) Foreign Application Priority Data

Oct. 19, 2023 (IN) ............................ 202311071453

(51) Int. Cl.
*G08G 5/34* (2025.01)
*B64D 43/00* (2006.01)
*G08G 5/20* (2025.01)

(52) U.S. Cl.
CPC ............... *G08G 5/34* (2025.01); *B64D 43/00* (2013.01); *G08G 5/20* (2025.01)

(58) Field of Classification Search
CPC .. G08G 5/34; G08G 5/20; G08G 5/21; G08G 5/23; G08G 5/26; G08G 5/53; G08G 5/55; B64D 43/00
See application file for complete search history.

(56) References Cited

U.S. PATENT DOCUMENTS 7,904,213 B2 3/2011 Coulmeau
8,285,427 B2 10/2012 Rogers et al.
(Continued)

FOREIGN PATENT DOCUMENTS

EP 4130676 A1 2/2023

OTHER PUBLICATIONS

Alishahi, Nasser, “Flight Planning,” Mar. 2021, downloaded from https://www.researchgate.net/publication/350323961 on Mar. 8, 2023.

*Primary Examiner* — Aniss Chad
*Assistant Examiner* — Chase L Cooley
(74) *Attorney, Agent, or Firm* — Ingrassia Fisher & Lorenz LLP

(57) ABSTRACT

Systems and methods are provided for management of an active flight plan during operation of an aircraft. The systems include a flight management system, a communications system configured to receive flight mission data from external sources, a display device, and a controller. The controller is configured to, by a processor: receive the flight mission data that includes recommended updates to the active flight plan, generate an inactive flight plan including the active flight plan modified based on the recommended updates, access the inactive flight plan to determine an impact of the recommended updates on the active flight plan, render a graphical image on the display device that presents a contextual preview of the recommended updates and the impact thereof, and in response to acceptance of the recommended updates, modify the active flight plan based on the recommended updates or replace the active flight plan with the inactive flight plan.

20 Claims, 5 Drawing Sheets

(56) References Cited

U.S. PATENT DOCUMENTS

| | | | | |
|---|---|---|---|---|
| 10,204,430 | B2 | 2/2019 | Gowda | |
| 10,565,885 | B2 | 2/2020 | Adler et al. | |
| 2005/0203675 | A1* | 9/2005 | Griffin, III | G08G 5/34 701/3 |
| 2017/0124734 | A1* | 5/2017 | Gowda | G06T 11/60 |
| 2017/0183105 | A1* | 6/2017 | Fournier | G01W 1/06 |
| 2022/0139233 | A1* | 5/2022 | Schwindt | G08G 5/26 701/3 |
| 2022/0388674 | A1 | 12/2022 | Kanagarajan et al. | |
| 2023/0023800 | A1 | 1/2023 | Da Conceicao et al. | |
| 2023/0215281 | A1 | 7/2023 | Sahoo et al. | |

* cited by examiner

SYSTEM AND METHODS FOR FLIGHT PLAN MANAGEMENT

CROSS REFERENCE TO RELATED APPLICATION

The present application claims benefit of prior filed India Provisional Patent Application No. 202311071453, filed Oct. 19, 2023, which is hereby incorporated by reference herein in its entirety.

TECHNICAL FIELD

The present invention generally relates to aircraft systems, and more particularly relates to systems and methods for in-flight management of a flight plan during operation of an aircraft.

BACKGROUND

In modern, connected flight management system (FMS) environments, real-time updates to flight plan parameters may be received from one or more external applications or services, such as an airline operation controller (AOC) or an electronic flight bag (EFB). These updates are typically intended to improve operational efficiency and safety of routine flights operations. The updates may include, for example, modifications to the active flight plan, speed and/or altitude profile changes, wind and/or temperature information, cost Index, time constraints, etc. Currently, these updates are reviewed by the crew and inserted into the active flight plan. However, the systems do not provide information relating to the impact of the updates prior to insertion into the active flight plan.

Hence, there is a need for systems and methods that promote flight crew awareness in relation to impacts of recommended updates to active flight plans. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for an aircraft that includes a flight management system configured for in-flight management of an active flight plan during operation of the aircraft, a communications system configured to receive flight mission data from external sources separate from the aircraft, a display device configured to display the flight mission data of the active flight plan, a controller operatively coupled with the flight management system, the communications system, and the display device. The controller is configured to, by a processor: receive the flight mission data from the external sources via the communications system, wherein the flight mission data includes recommended updates to the active flight plan, generate an inactive flight plan that includes a copy of the active flight plan modified based on the recommended updates, access the inactive flight plan to determine a potential impact of the recommended updates on the active flight plan, render a graphical image on the display device that presents a contextual preview of the recommended updates and the potential impact of the recommended updates, and in response to acceptance of the recommended updates, modify the active flight plan based on the recommended updates or replace the active flight plan with the inactive flight plan.

A method is provided for in-flight management of an active flight plan during operation of an aircraft. The method includes, by a processor: receiving flight mission data from an external source separate from the aircraft, wherein the flight mission data includes recommended updates to the active flight plan, generating an inactive flight plan that includes a copy of the active flight plan modified based on the recommended updates, accessing the inactive flight plan to determine a potential impact of the recommended updates on the active flight plan, rendering a graphical image on a display device onboard the aircraft that presents a contextual preview of the recommended updates and the potential impact of the recommended updates, and, in response to acceptance of the recommended updates, modifying the active flight plan based on the recommended updates or replacing, by the processor, the active flight plan with the inactive flight plan.

An aircraft is provided that includes a database having an active flight plan stored therein, a flight management system configured for in-flight management of the active flight plan during operation of the aircraft, a communications system configured to receive flight mission data from external sources separate from the aircraft, a display device configured to display the flight mission data of the active flight plan, and a controller onboard the aircraft and operatively coupled with the flight management system, the communications system, and the display device. The controller is configured to, by a processor: receive the flight mission data from the external sources via the communications system, wherein the flight mission data includes recommended updates to the active flight plan, generate an inactive flight plan that includes a copy of the active flight plan modified based on the recommended updates, access the inactive flight plan to determine a potential impact of the recommended updates on the active flight plan, render a graphical image on the display device that presents a contextual preview of the recommended updates and the potential impact of the recommended updates, and, in response to acceptance of the recommended updates, modify the active flight plan based on the recommended updates or replace the active flight plan with the inactive flight plan.

Furthermore, other desirable features and characteristics of the system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
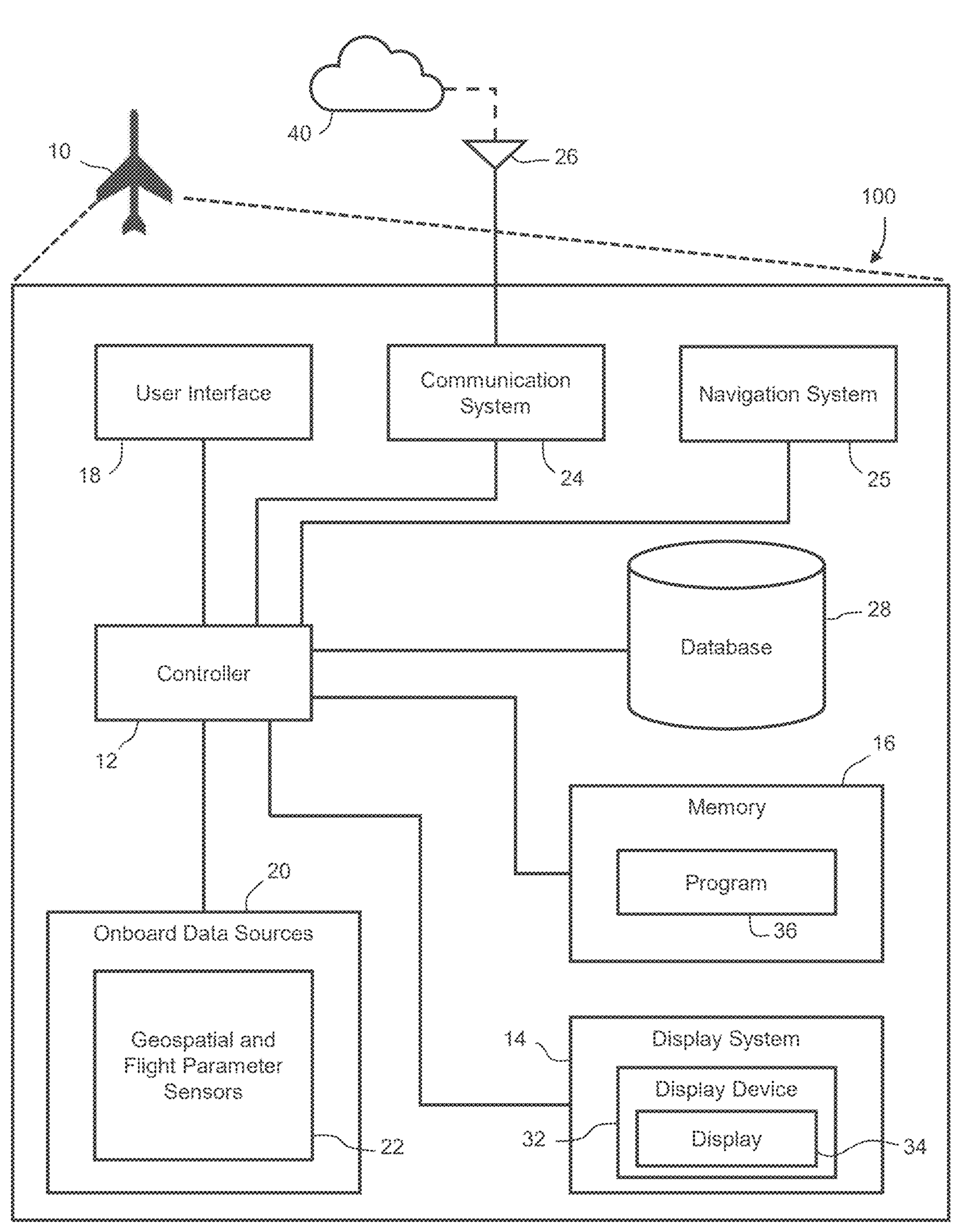
FIG. 1 is a block diagram representing an exemplary aircraft having a flight plan management system in accordance with an embodiment.

The following detailed description is merely exemplary in nature and is not intended to limit the invention or the application and uses of the invention. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods disclosed herein provide for promoting crew awareness regarding travel plan updates during in-flight operation of mobile platforms. For convenience, the mobile platform will be discussed herein in reference to an aircraft and the travel plan will refer to a flight plan of the aircraft. It should be noted that the term aircraft, as utilized herein, may include any manned or unmanned object capable of flight. Examples of aircraft may include, but are not limited to, fixed-wing aerial vehicles (e.g., propeller-powered or jet powered), rotary-wing aerial vehicles (e.g., helicopters), manned aircraft, unmanned aircraft (e.g., unmanned aerial vehicles, or UAVs), delivery drones, etc. For convenience, the systems and methods will be described in reference to a manned airplane; however, the systems and methods are not limited to such application and may be applicable to any mobile platform that uses a predetermined travel plan and which may receive updates to such travel plan during travel. In various embodiments, the systems and methods may be at least partially performed by remote or ground-based platforms in communication with an aircraft.

The systems receive recommended modifications or updates to a current or active flight plan from an external source, such as an airline operation controller, an electronic flight bag, or a cockpit mission manager, during in-flight operation of the aircraft. The systems may assess an impact or effect of the recommended updates and then provide information relating to the impact to the flight crew. In this manner, the flight crew may be capable of rapidly processing the impact of the recommended updates and deciding whether to update the active flight plan to incorporate the recommended updates. In this manner, the systems and methods may promote flight management efficiency and safety.

Referring now to FIG. 1, an aircraft 10, such as an airplane, and certain systems thereof are illustrated in accordance with an exemplary and non-limiting embodiment of the present disclosure. A flight plan management system 100 may be utilized onboard the aircraft 10 as described herein. As schematically depicted in FIG. 1, the system 100 includes and/or is functionally coupled to the following components or subsystems, each of which may assume the form of a single device or multiple interconnected devices, including, but not limited to, a controller 12 operationally coupled to: at least one display device 32, which may optionally be part of a larger on-board display system 14; computer-readable storage media or memory 16; an optional user interface 18, and onboard data sources 20 including, for example, an array of geospatial and flight parameter sensors 22. The system 100 may be separate from or integrated within a flight management system (FMS) and/or a flight control system (FCS). The system 100 may also contain a communication system 24 including an antenna 26, which may wirelessly transmit data to and receive data from various sources external to the system 100. The system 100 may include a navigation system 25 configured to manage and monitor the navigation of the aircraft 10, including a flight plan and the position of the aircraft 10.

Although schematically illustrated in FIG. 1 as a single unit, the individual elements and components of the system 100 can be implemented in a distributed manner utilizing any practical number of physically distinct and operatively interconnected pieces of hardware or equipment. When the system 100 is utilized as described herein, the various components of the system 100 will typically all be located onboard the aircraft 10.

The term “controller,” as appearing herein, broadly encompasses those components utilized to carry-out or otherwise support the processing functionalities of the system 100. Accordingly, the controller 12 can encompass or may be associated with any number of individual processors, flight control computers, navigational equipment pieces, computer-readable memories (including or in addition to the memory 16), power supplies, storage devices, interface cards, and other standardized components.

In various embodiments, the controller 12 includes at least one processor, a communication bus, and a computer readable storage device or media. The processor performs the computation and control functions of the controller 12. The processor can be any custom made or commercially available processor, a central processing unit (CPU), a graphics processing unit (GPU), an auxiliary processor among several processors associated with the controller 12, a semiconductor-based microprocessor (in the form of a microchip or chip set), any combination thereof, or generally any device for executing instructions. The computer readable storage device or media may include volatile and nonvolatile storage in read-only memory (ROM), randomaccess memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 12. The bus serves to transmit programs, data, status and other information or signals between the various components of the aircraft 10. The bus can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor, receive and process signals from the sensors 22, perform logic, calculations, methods and/or algorithms, and generate data based on the logic, calculations, methods, and/or algorithms. Although only one controller 12 is shown in FIG. 1, embodiments of the aircraft 10 can include any number of controllers 12 that communicate over any suitable communication medium or a combination of communication mediums and that cooperate to process the sensor signals, perform logic, calculations, methods, and/or algorithms, and generate data. In various embodiments, the controller 12 includes or cooperates with at least one firmware and software program (generally, computer-readable instructions that embody an algorithm) for carrying-out the various process tasks, calculations, and control/display functions described herein. During operation, the controller 12 may be programmed with and execute at least one firmware or software program, for example, a program 36, that embodies one or more algorithms, to thereby perform the various process steps, tasks, calculations, and control/display functions described herein.

The controller 12 may exchange data with one or more external sources 40 to support operation of the system 100 in various embodiments. In this case, bidirectional wireless data exchange may occur via the communication system 24 over a communications network, such as a public or private network implemented in accordance with Transmission Control Protocol/Internet Protocol architectures or other conventional protocol standards. Encryption and mutual authentication techniques may be applied, as appropriate, to ensure data security.

In various embodiments, the communication system 24 is configured to support instantaneous (i.e., real time or current) communications between on-board systems, the controller 12, and the one or more external source(s) 40. The communication system 24 may incorporate one or more transmitters, receivers, and the supporting communications hardware and software required for components of the system 100 to communicate as described herein. In various embodiments, the communication system 24 may have additional communications not directly relied upon herein, such as bidirectional pilot-to-ATC (air traffic control) communications via a datalink, and any other suitable radio communication system that supports communications between the aircraft 10 and various external source(s).

The memory 16 can encompass any number and type of storage media suitable for storing computer-readable code or instructions, such as the program 36, as well as other data generally supporting the operation of the system 100. As can be appreciated, the memory 16 may be part of the controller 12, separate from the controller 12, or part of the controller 12 and part of a separate system. The memory 16 can be any suitable type of storage apparatus, including various different types of direct access storage and/or other memory devices.

A source of information suitable for operation of other the aircraft 10 and/or displaying various environmental renderings during operation of the aircraft 10 may be part of the system 100. In certain embodiments, the source is one or more databases 28 employed to receive and store map data, which may be updated on a periodic or iterative basis to ensure data timeliness. In various embodiments, the map data may include various terrain and manmade object locations and elevations and may be stored in the memory 16 or in the one or more databases 28, and referenced by the program 36. In various embodiments, these databases 28 may be available online and accessible remotely by a suitable wireless communication system, such as the communication system 24.

The sensors 22 supply various types of data and/or measurements to the controller 12. In various embodiments, the sensors 22 supply, without limitation, one or more of: inertial reference system measurements providing a location, Flight Path Angle (FPA) measurements, airspeed data, groundspeed data, vertical speed data, vertical acceleration data, altitude data, attitude data including pitch data and roll measurements, yaw data, data related to ownship weight, time/date information, heading information, data related to atmospheric conditions, flight path data, flight track data, radar altitude data, geometric altitude data, wind speed and direction data for the aircraft 10 and/or for other aircraft. Further, in certain embodiments of the system 100, the controller 12, and the other components of the system 100 may be included within or cooperate with any number and type of systems commonly deployed onboard aircraft including, for example, an FMS, an Attitude Heading Reference System (AHRS), an Instrument Landing System (ILS), and/or an Inertial Reference System (IRS).

The navigation system 25 can provide navigation data associated with the aircraft's current position and flight direction (e.g., heading, course, track, etc.) to the controller 12. As such, the navigation system 25 can include, for example, an inertial navigation system, a satellite navigation system (e.g., Global Positioning System) receiver, VLF/OMEGA, Loran C, VOR/DME, DME/DME, IRS, aircraft attitude sensors, or the navigation information can come from a flight management system. The navigation data provided to the controller 12 can also include information about the aircraft's airspeed, ground speed, altitude (e.g., relative to sea level), pitch, and other important flight information. In any event, for this example embodiment, the navigation system 25 can include any suitable position and direction determination devices that are capable of providing the controller 12 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

With continued reference to FIG. 1, the display device 32 can include any number and type of image generating devices on which one or more avionic displays 34 may be produced. In various embodiments, the display device 32 may be affixed to the static structure of the aircraft 10 cockpit as, for example, a Head Down Display (HDD) or Head Up Display (HUD) unit. Alternatively, the display device 32 may assume the form of a movable display device (e.g., a pilot-worn display device) or a portable display device, such as an Electronic Flight Bag (EFB), a laptop, or a tablet computer carried into the aircraft 10 cockpit by a pilot.

At least one avionic display 34 is generated on display device 32 during operation of the system 100. The term "avionic display" as used herein is synonymous with the terms "aircraft-related display" and "cockpit display" and encompasses displays generated in textual, graphical, cartographical, and other formats. The system 100 can generate various types of lateral and vertical avionic displays 34 on which symbology, text annunciations, and other graphics pertaining to flight planning are presented for a pilot to view. The display device 32 is configured to continuously render at least one avionic display 34 showing a terrain environment at a current location of the aircraft 10. The avionic display 34 generated and controlled by the system 100 can include alphanumerical input displays of the type commonly presented on the screens of multi-function control and display units (MCDUs), as well as Control Display Units (CDUs) and Multi-function Displays (MFDs), generally. Specifically, certain embodiments of the avionic displays 34 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display.

In various embodiments, a human-machine interface, such a touch screen display, is implemented as an integration of the user interface 18 and the display device 32. Via various display and graphics systems processes, the controller 12 may command and control the touch screen display generating a variety of graphical user interface (GUI) objects or elements, for example, buttons, sliders, and the like, which are used to prompt a user to interact with the human-machine interface to provide user input, and to activate respective functions and provide user feedback, responsive to received user input at the GUI element.

Figure 2:
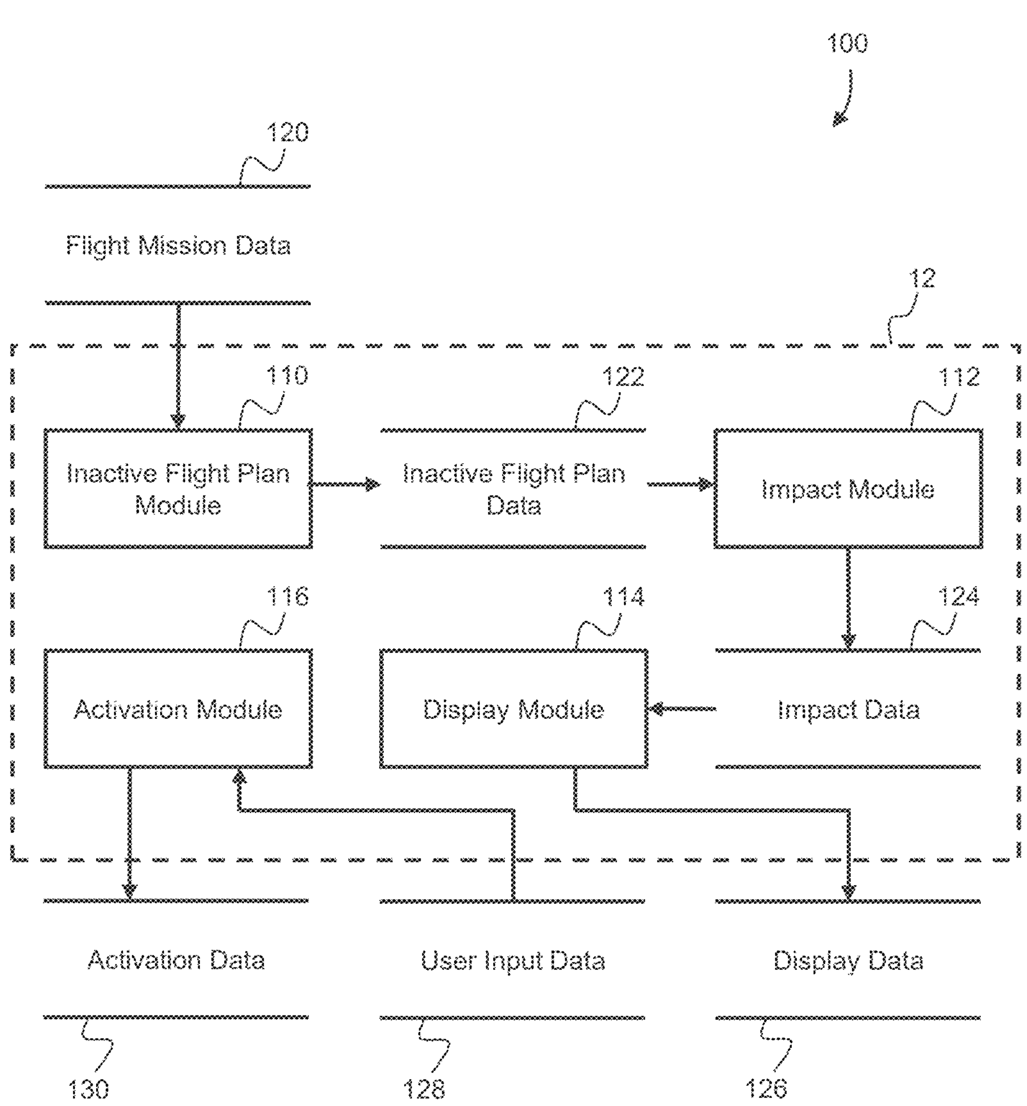
FIG. 2 is a dataflow diagram illustrating operation of the flight plan management system of FIG. 1 in accordance with an embodiment.

With reference to FIG. 2 and with continued reference to FIG. 1, a dataflow diagram illustrates elements of the flight plan management system 100 of FIG. 1 in accordance with various embodiments. As can be appreciated, various embodiments of the system 100 according to the present disclosure may include any number of modules embedded within the controller 12 which may be combined and/or further partitioned to similarly implement systems and methods described herein. Furthermore, inputs to the system 100 may be received from other control modules (not shown) associated with the aircraft 10, and/or determined/modeled by other sub-modules (not shown) within the controller 12. Furthermore, the inputs might also be subjected to preprocessing, such as sub-sampling, noise-reduction, normalization, feature-extraction, missing data reduction, and the like. In various embodiments, the system 100 includes an inactive flight plan module 110, an impact module 112, a display module 114, and an activation module 116.

In various embodiments, the inactive flight plan module 110 receives as input flight mission data 120 received from the one or more external sources 40. The flight mission data 120 includes various data indicating recommended updates to the active flight plan of the aircraft 10. The inactive flight plan module 110 generates an inactive flight plan that includes a copy of the active flight plan modified by the recommended updates contained in the flight mission data 120. Notably, the inactive flight plan is maintained in an intermediate, inactive state and the recommended updates are not immediately implemented into the active flight plan. The inactive flight plan module 110 generates inactive flight plan data 122 that includes various data indicating the inactive flight plan.

In various embodiments, the impact module 112 receives as input the inactive flight plan data 122 generated by the inactive flight plan module 110. The impact module 112 performs an assessment of the inactive flight plan to determine a potential impact of recommended updates. The impact module 112 generates impact data 124 that includes various data indicating the inactive flight plan, the recommended updates, and/or the determined potential impact of the recommended updates on the active flight plan.

In various embodiments, the display module 114 receives as input the impact data 124 generated by the impact module 112. The display module 114 generates display data 126 that includes various data configured to render a graphical image on the display device 32 that presents a contextual preview of the inactive flight plan, the recommended updates, and/or the potential impact of the recommended updates. The display module 114 may transmit the display data 126 to the display system 14.

In various embodiments, the activation module 116 receives as input user input data 128 generated by the user interface 18. The user input data 128 includes various data indicating a decision by the user to accept or reject the recommended updates. In response to an acceptance of the recommended updates, the activation module 116 generates activation data 130 that includes various data configured to either modify the active flight plan based on the recommended updates or replace the active flight plan with the inactive flight plan; that is, activate the inactive flight plan. The activation module 116 may transmit the activation data 130 to other systems of the aircraft 10, such as a flight management system, and/or store the activation data 130 in the database 28.

Figure 3:
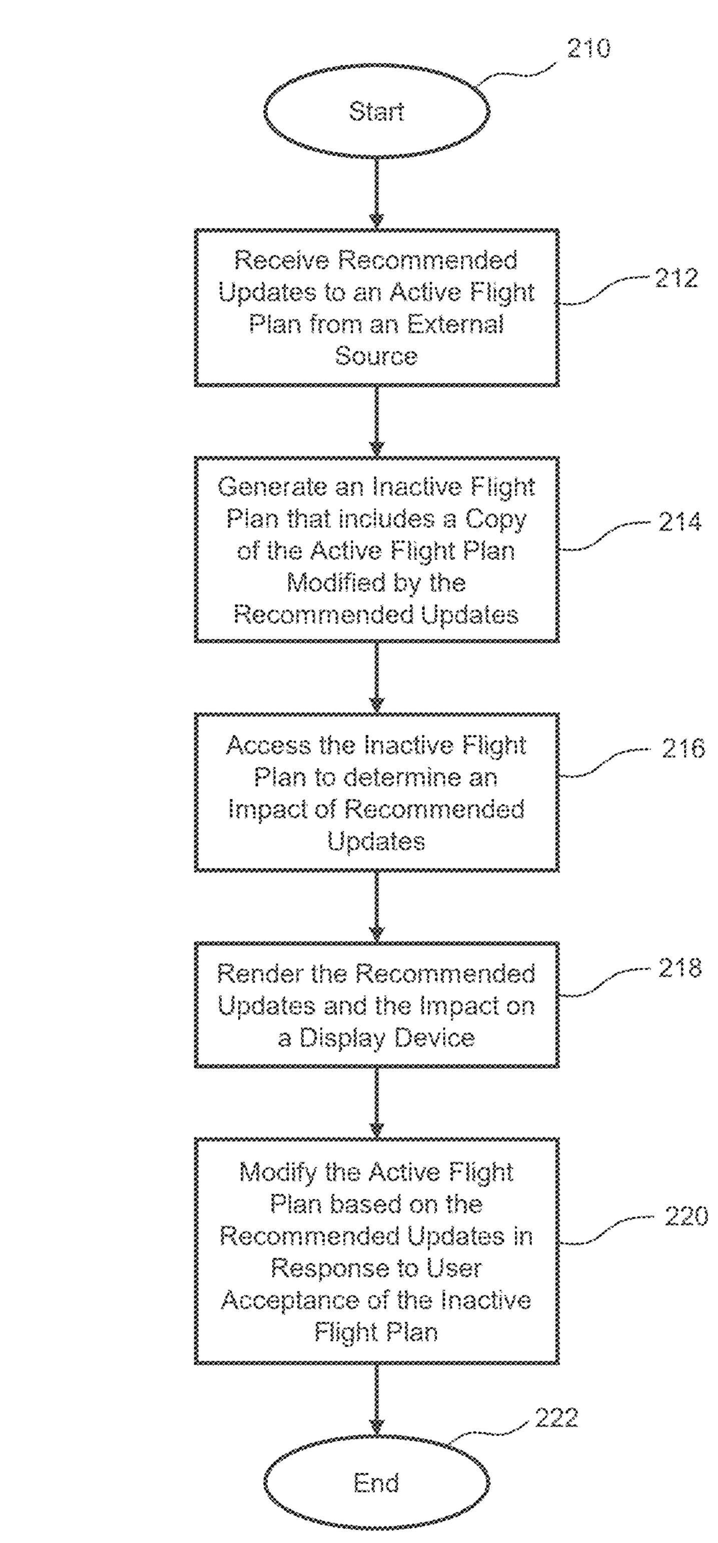
FIG. 3 is a flowchart illustrating an exemplary method for in-flight management of an active flight plan during operation of an aircraft in accordance with an embodiment.

The systems disclosed herein, including the system 100, provide for methods of in-flight management of an active flight plan during operation of an aircraft, such as the aircraft 10. For example, FIG. 3 is a flowchart illustrating an exemplary method 200 for managing a flight plan. The method 200 may start at 210. At 212, the method 200 may include receiving, by a processor (e.g., of the controller 12), flight mission data from an external source remote and/or separate from the aircraft. The flight mission data includes recommended updates to the active flight plan. At 214, the method 200 may include generating, by the processor, an inactive flight plan that includes a copy of the active flight plan modified based on the recommended updates. At 216, the method 200 may include accessing, by the processor, the inactive flight plan to determine a potential impact of the recommended updates on the active flight plan. In various embodiments, the method 200 may alternatively store the flight mission data in an inactive state and compare the recommended updates to the active flight plan, rather than generating an inactive flight plan. At 218, the method 200 may include rendering, by the processor, a graphical image on a display device onboard the aircraft that presents a contextual preview of the recommended updates and the impact of the recommended updates. In various embodiments, the message may be contained in a popup window. In various embodiments, the method 200 may include generating a warning (e.g., audible, visual, vibration, etc.) in response to a determination that the impact of the recommended updates pose a risk to the aircraft. At 220, the method 200 may include, in response to acceptance of the recommended updates, modifying, by the processor, the active flight plan based on the recommended updates or replacing, by the processor, the active flight plan with the inactive flight plan. In contrast, the active flight plan may remain unchanged and the recommended updates may be canceled and/or deleted in response to a rejection of the recommended updates. The method 200 may end at 222.

Figure 5:
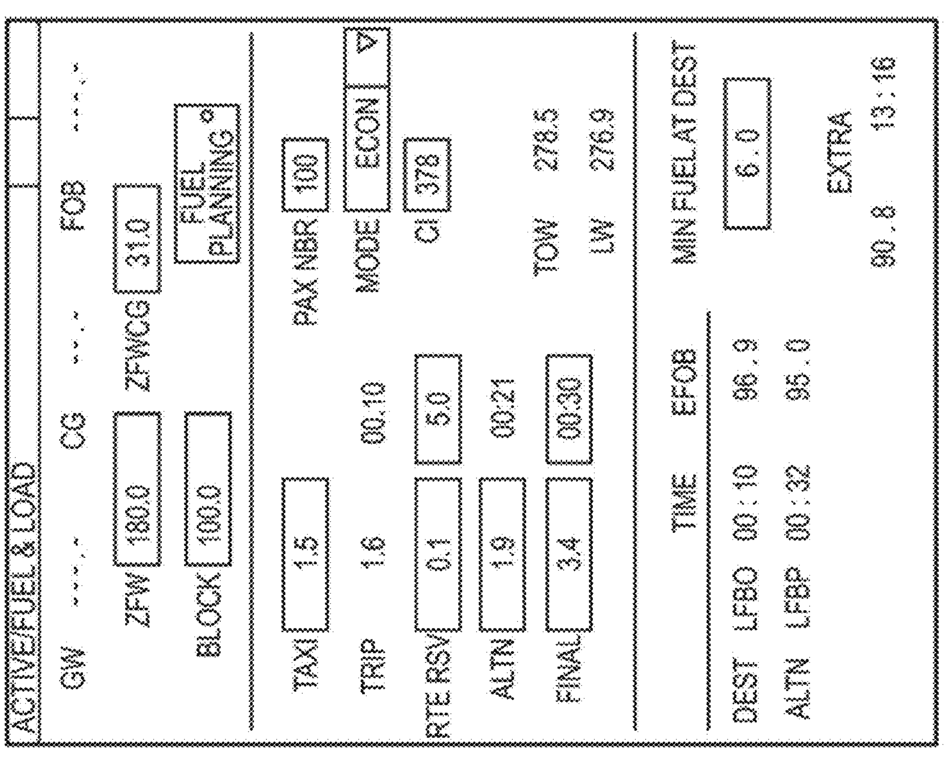
FIG. 5 is a second avionic display including certain information relating to fuel and weight of an in-flight aircraft in accordance with an embodiment.
Figure 4:
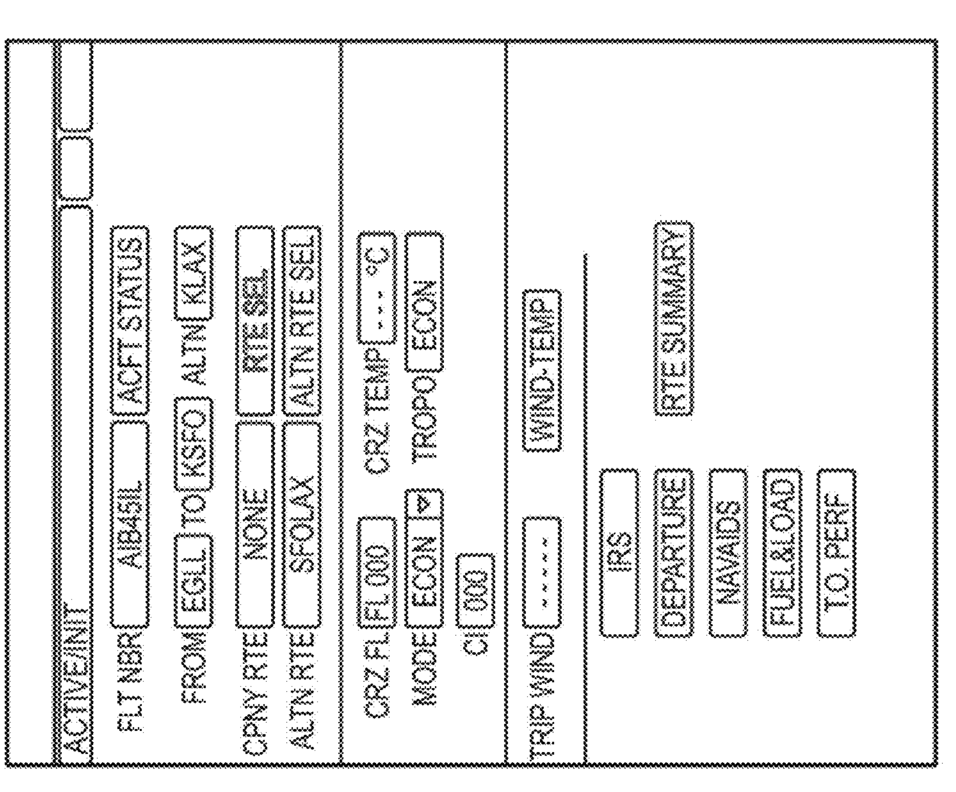
FIG. 4 is a first avionic display including certain information relating to an active flight plan for an in-flight aircraft in accordance with an embodiment.

With reference to FIGS. 4-7, and with continued reference to FIGS. 1-3, exemplary avionic displays are represented that illustrate various nonlimiting aspects of the systems and methods disclosed herein. It should be understood that the avionic displays for FIGS. 4-7 are exemplary and the systems and methods disclosed herein may render avionic displays having other content and/or formats. FIG. 4 presents a first avionic display presenting details of an active flight plan for an aircraft and FIG. 5 presents a second avionic display presenting details of the active flight plan relating to the fuel and load characteristics of the flight.

Figures 6, 7:
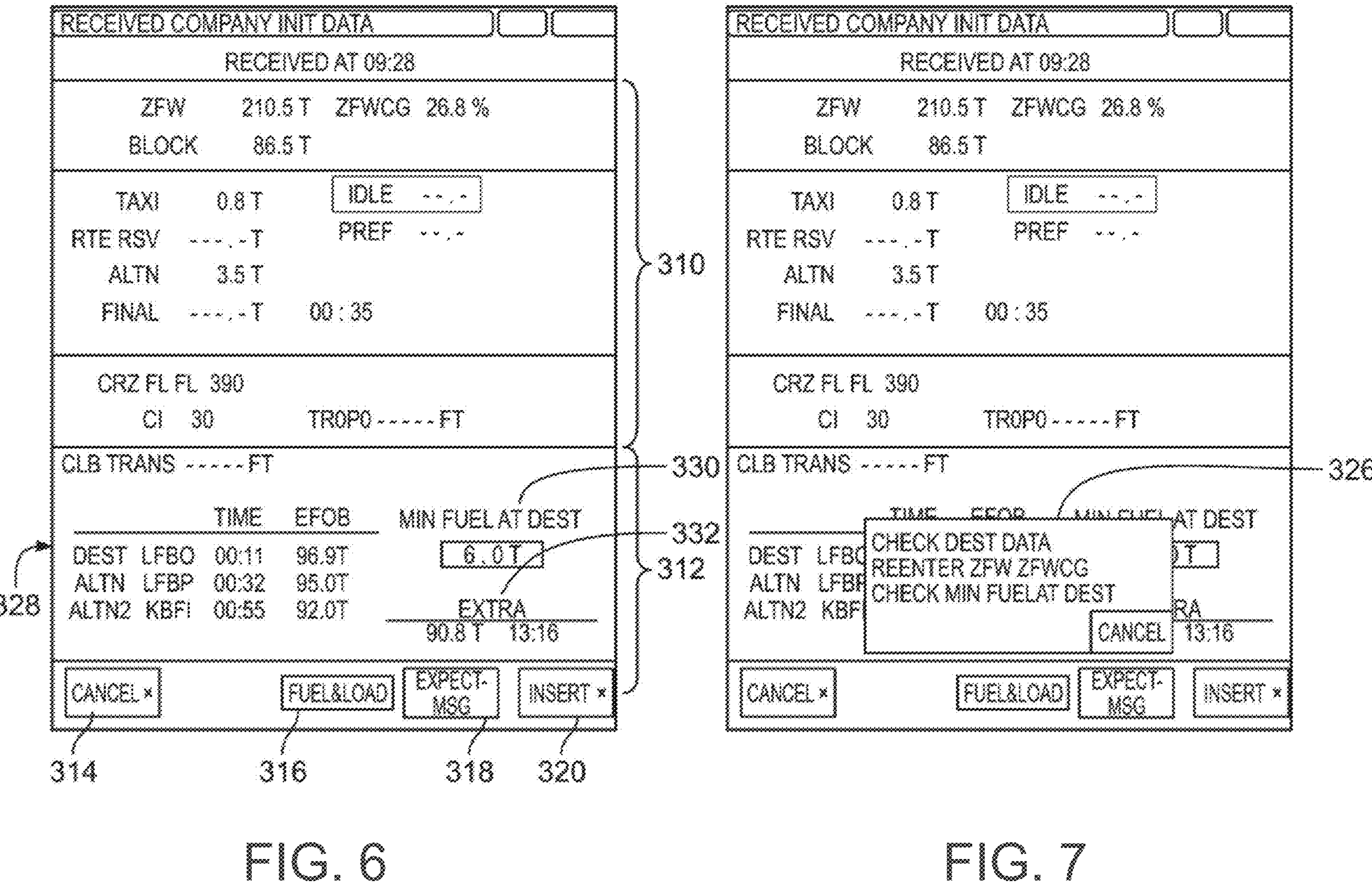
FIG. 6 is a third avionic display including predictive information relating to an impact of recommended updates to an active flight plan of an in-flight aircraft in accordance with an embodiment.
FIG. 7 is the third avionic display of FIG. 4 with an additional popup window indicating information related to expected messages if the recommended updates are implemented into the active flight plan in accordance with an embodiment.

FIG. 6 presents a third avionic display that includes flight mission data received from one or more external sources. A first area 310 of the third avionic display shows certain recommended updates to the active flight plan contained within the flight mission data. A second area 312 shows certain potential impacts of the recommended updates on the active flight plan. In this example, the second area 312 includes a list 328 of destinations, corresponding estimated travel times (TIME) to each of the destinations, and estimated fuel on board (EFOB) upon arrival at the destinations. Also presented in a minimum fuel on board parameter 330 and an extra fuel estimate (EXTRA) 332.

The third avionic display provides a user with various options including interaction with one or more buttons. In this example, the third avionic display includes a cancel (CANCEL) button 314, a fuel and load button (FUEL&LOAD) 316, an expected message (EXPECT-MSG) button 318, and an insertion (INSERT) button 320. The cancel button 314 may be activated by the user to cancel the received flight mission data and thereby reject the recommended updates without changing the active flight plan. The fuel and load button 316 may be activated by the user to provide additional information relating to fuel and weight characteristics of the aircraft. In various embodiments, activation of the fuel and load button 316 may open another avionic display. The expected message button 318 may be activated by the user to display a list of messages, if any, that are predicted to be displayed to the user in the event that the recommended updates are implemented into the active flight plan. The insertion button 320 may be activated by the user to accept the recommended updates and thereby change to the active flight plan based on the recommended updates.

FIG. 7 presents the third avionic display including a popup window 326 (e.g., a scratch pad message) rendered in response to the user activating the expected message button 318. In this example, the expected messages may include, but are not limited to, instructions to the flight crew to check the destination data, re-enter the zero fuel weight and the zero fuel weight center of gravity parameters, and check the minimum fuel at destination parameter. In various embodiments, the expected messages may include one or more expected flight management advisory messages.

The systems and methods disclosed herein provide various benefits over certain existing systems and methods. For example, the systems and methods disclosed herein provide a preview of recommended updates and an assessment of the impact of the changes to an active flight plan. Display of the predictive information on a review page may promote situational awareness and quick responses by a flight crew, promote efficient communication and coordination between the flight crew and a dispatcher, promote intuitive data visualization, and promote safety and security by providing validation of data prior to insertion into the active flight plan (e.g., potentially preventing insertion of malicious data).

In various embodiments, the systems and methods improve avionic displays and flight plan management systems by generating an inactive flight plan that includes a copy of the active flight plan modified based on the recommended updates, accessing the inactive flight plan to determine a potential impact of the recommended updates on the active flight plan, rendering a graphical image on a display device onboard the aircraft that presents a contextual preview of the recommended updates and the impact of the recommended updates, and, in response to acceptance of the recommended updates, modifying the active flight plan based on the recommended updates or replacing the active flight plan with the inactive flight plan. These improvements allow flight crews to review impacts of the recommended updates in an intermediate, inactive state prior to changing the active flight plan.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for an aircraft, the system comprising:

a flight management system, onboard the aircraft, configured for in-flight management of an active flight plan during operation of the aircraft and a position of the aircraft;

a communications system, onboard the aircraft, configured to receive flight mission data from external sources separate from the aircraft;

a display device, onboard the aircraft, configured to display the flight mission data of the active flight plan;

a controller, onboard the aircraft, operatively coupled with the flight management system, the communications system, and the display device, the controller configured to, by one or more processors:

receive the flight mission data from the external sources via the communications system during in-flight operation of the aircraft, wherein the flight mission data includes recommended updates to parameters of the active flight plan;

generate an inactive flight plan that includes a computer-readable copy of the active flight plan modified based on the recommended updates and store the computer-readable copy in a memory device onboard the aircraft;

maintain the inactive flight plan in an intermediate, inactive state to enable assessment and review of the inactive flight plan without implementing the recommended updates into the active flight plan;

assess the inactive flight plan to determine a potential impact of the recommended updates on the active flight plan including an estimated travel time to a destination and an estimated fuel on board upon arrival at the destination;

render a graphical image on the display device that presents a contextual preview that includes both the recommended updates and the potential impact of the recommended updates including the estimated travel time to the destination and the estimated fuel on board upon arrival at the destination;

in response to a user to request, predict and display expected messages that are predicted to be displayed to the user in the event that the recommended updates are implemented into the active flight plan, wherein the expected messages include one or more flight management advisory messages;

generate a warning in response to the potential impact of the recommended updates posing a risk to the aircraft;

provide validation of the recommended updates prior to insertion into the active flight plan; and in response to acceptance of the recommended updates, generate activation data configured to either modify the active flight plan based on the recommended updates or replace the active flight plan with the inactive flight plan and thereby produce a new or updated flight plan, and transmit the activation data to other systems of the aircraft including the flight management system to cause the new or updated flight plan to be activated, wherein the flight management system navigates and controls the aircraft based on the new or updated flight plan.

2. The system of claim 1, wherein the controller is configured to, by the one or more processors:

render a popup window that includes a message configured to direct an operator's attention to the potential impact of the recommended updates.

3. The system of claim 1, wherein the external sources include an airline operation controller, electronic flight bag, or cockpit mission manager.

4. The system of claim 1, wherein the controller is configured to, by the one or more processors:

render, on the display device, a graphical user interface that allows for a user to accept or reject the recommended updates via a human-machine interface, wherein the active flight plan is modified or replaced based on the recommended updates in response to the user accepting the recommended updates and the active flight plan remains the same in response to the user rejecting the recommended updates, wherein the graphical user interface allows for the user to request the expected messages.

5. The system of claim 1, wherein the contextual preview includes a minimum fuel on board parameter and an extra fuel estimate.

6. The system of claim 1, wherein the validation is configured to, at least in part, prevent insertion of malicious data.

7. The system of claim 1, wherein the warning is audible and/or vibration.

8. A method for in-flight management of an active flight plan during operation of an aircraft, the method comprising:

receiving, by one or more processors on board the aircraft, flight mission data from an external source separate from the aircraft during in-flight operation of the aircraft, wherein the flight mission data includes recommended updates to parameters the active flight plan;

generating, by the one or more processors, an inactive flight plan that includes a computer-readable copy of the active flight plan modified based on the recommended updates and storing the computer-readable copy in a memory device onboard the aircraft;

maintaining the inactive flight plan in an intermediate, inactive state to enable assessment and review of the inactive flight plan without implementing the recommended updates into the active flight plan;

assessing, by the one or more processors, the inactive flight plan to determine a potential impact of the recommended updates on the active flight plan including an estimated travel time to a destination and an estimated fuel on board upon arrival at the destination;

rendering, by the one or more processors, a graphical image on a display device onboard the aircraft that presents a contextual preview that includes both the recommended updates and the potential impact of the recommended updates including the estimated travel time to the destination and the estimated fuel onboard upon arrival at the destination;

in response to a user to request, predicting and displaying, by the one or more processors, expected messages that are predicted to be displayed to the user in the event that the recommended updates are implemented into the active flight plan, wherein the expected messages include one or more flight management advisory messages;

generating a warning in response to the potential impact of the recommended updates posing a risk to the aircraft, validating, by the one or more processors, the recommended updates prior to insertion into the active flight plan; and in response to acceptance of the recommended updates, generating activation data configured to either modify, by the one or more processors, the active flight plan based on the recommended updates or replace, by the one or more processors, the active flight plan with the inactive flight plan and thereby produce a new or updated flight plan, and transmit the activation data to other systems of the aircraft including a flight management system of the aircraft to cause the new or updated flight plan to be activated, wherein the flight management system navigates and controls the aircraft based on the new or updated flight plan.

9. The method of claim 8, further comprising:

rendering, by the one or more processors, a popup window that includes a message configured to direct an operator's attention to the potential impact of the recommended updates.

10. The method of claim 8, wherein the external source includes an airline operation controller, electronic flight bag, or cockpit mission manager.

11. The method of claim 8, further comprising:

rendering, one or more processors, on the display device a graphical user interface that allows for a user to accept or reject the recommended updates via a human-machine interface, wherein the active flight plan is modified or replaced based on the recommended updates in response to the user accepting the recommended updates and the active flight plan remains the same in response to the user rejecting the recommended updates, wherein the graphical user interface allows for the user to request the expected messages.

12. The method of claim 8, wherein the contextual preview includes a minimum fuel on board parameter and an extra fuel estimate.

13. The method of claim 8, wherein the validation is configured to, at least in part, prevent insertion of malicious data.

14. The method of claim 8, wherein the warning is audible and/or vibration.

15. An aircraft comprising:

a database, onboard the aircraft, having an active flight plan stored therein;

a flight management system, onboard the aircraft, configured for in-flight management of the active flight plan during operation of the aircraft and a position of the aircraft;

a communications system, onboard the aircraft, configured to receive flight mission data from external sources separate from the aircraft;

a display device, onboard the aircraft, configured to display the flight mission data of the active flight plan;

a controller onboard the aircraft and operatively coupled with the flight management system, the communications system, and the display device, the controller configured to, by one or more processors:

receive the flight mission data from the external sources via the communications system during in-flight operation of the aircraft, wherein the flight mission data includes recommended updates to parameters of the active flight plan;

generate an inactive flight plan that includes a computer-readable copy of the active flight plan modified based on the recommended updates and store the computer-readable copy in a memory device onboard the aircraft;

maintain the inactive flight plan in an intermediate, inactive state to enable assessment and review of the inactive flight plan without implementing the recommended updates into the active flight plan;

assess the inactive flight plan to determine a potential impact of the recommended updates on the active flight plan including an estimated travel time to a destination and an estimated fuel on board upon arrival at the destination;

render a graphical image on the display device that presents a contextual preview that includes both the recommended updates and the potential impact of the recommended updates including the estimated travel time to the destination and the estimated fuel on board upon arrival at the destination;

in response to a user to request, predict and display expected messages that are predicted to be displayed to the user in the event that the recommended updates are implemented into the active flight plan, wherein the expected messages include one or more flight management advisory messages;

generate a warning in response to the potential impact of the recommended updates posing a risk to the aircraft;

provide validation of the recommended updates prior to insertion into the active flight plan; and in response to acceptance of the recommended updates, generate activation data configured to either modify the active flight plan based on the recommended updates or replace the active flight plan with the inactive flight plan and thereby produce a new or updated flight plan, and transmit the activation data to other systems of the aircraft including the flight management system to cause the new or updated flight plan to be activated, wherein the flight management system navigates and controls the aircraft based on the new or updated flight plan.

16. The aircraft of claim 15, wherein the external sources include an airline operation controller, electronic flight bag, or cockpit mission manager.

17. The aircraft of claim 15, wherein the controller is configured to, by the one or more processors:

render, on the display device, a graphical user interface that allows for a user to accept or reject the recommended updates via a human-machine interface, wherein the active flight plan is modified or replaced based on the recommended updates in response to the user accepting the recommended updates and the active flight plan remains the same in response to the user rejecting the recommended updates, wherein the graphical user interface allows for the user to request the expected messages.

18. The aircraft of claim 15, wherein the contextual preview includes a minimum fuel on board parameter and an extra fuel estimate.

19. The aircraft of claim 15, wherein the validation is configured to, at least in part, prevent insertion of malicious data.

20. The aircraft of claim 15, wherein the warning is audible and/or vibration.

* * * * *